(No Model.) 2 Sheets—Sheet 1.

J. A. CLOTHER.
COMBINED HEATING AND COOKING STOVE.

No. 367,133. Patented July 26, 1887.

Witnesses
Norris A. Clark.
Geo. H. Cooper Jr.

Inventor
Jane A. Clother
by her Atty
Benj. R. Catlin (No Model.)  2 Sheets—Sheet 2.

J. A. CLOTHER.
COMBINED HEATING AND COOKING STOVE.

No. 367,133. Patented July 26, 1887.

Witnesses
Norris A. Clark
Geo. H. Cooper Jr.

Inventor
Jane A. Clother,
by her Atty
Benj. R. Catlin

UNITED STATES PATENT OFFICE.

JANE A. CLOTHER, OF CUMBERLAND, WISCONSIN.

COMBINED HEATING AND COOKING STOVE.

SPECIFICATION forming part of Letters Patent No. 367,133, dated July 26, 1887.

Application filed January 26, 1887. Serial No. 225,513. (No model.)

*To all whom it may concern:*

Be it known that I, JANE A. CLOTHER, a citizen of the United States, residing at Cumberland, in the county of Barron and State of Wisconsin, have invented certain new and useful Improvements in Combined Heating and Cooking Stoves; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a stove having two fronts and two fire-chambers and adapted for cooking and heating; and it consists in certain combinations of parts, hereinafter described, and particularly pointed out in the claims.

The accompanying drawings represent a stove embodying my invention; but said invention is not limited to all the details illustrated nor to any particulars of construction or ornamentation, except as hereinafter specified.

Figure 1:
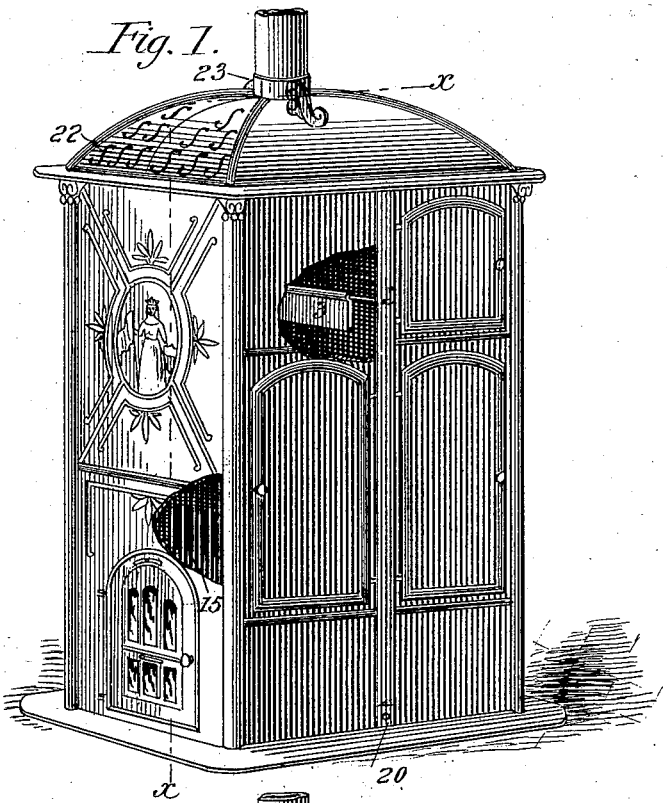
Figure 2:
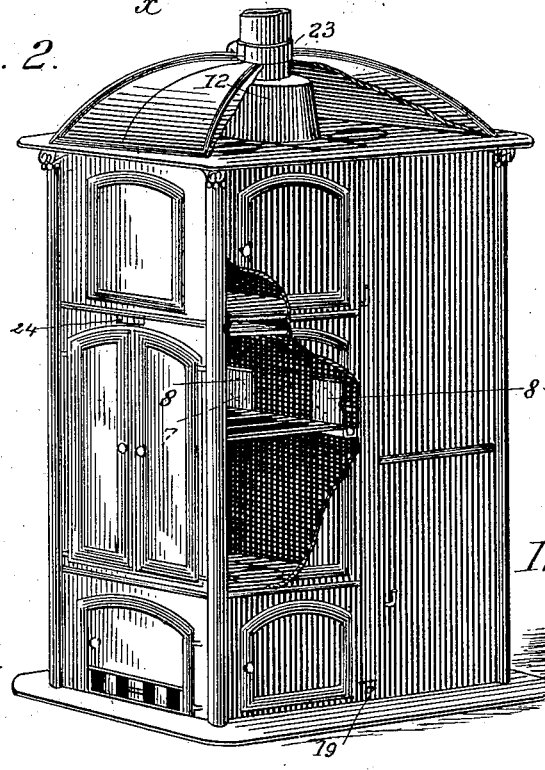
Figure 3:
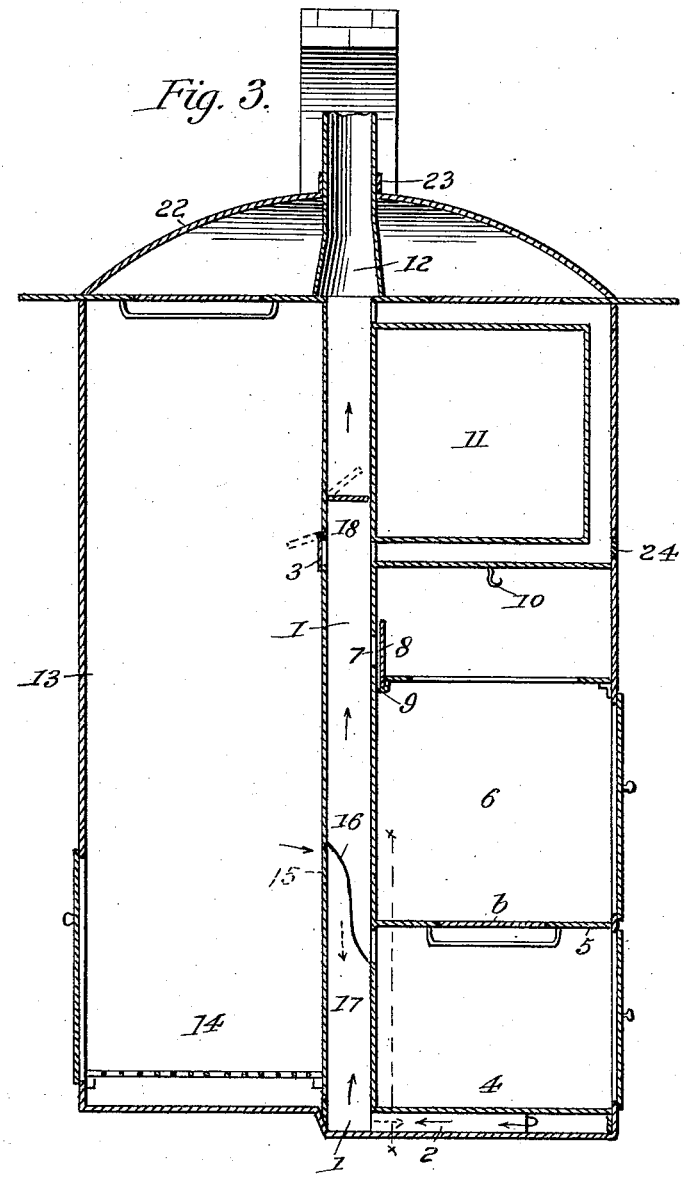
Figure 4:
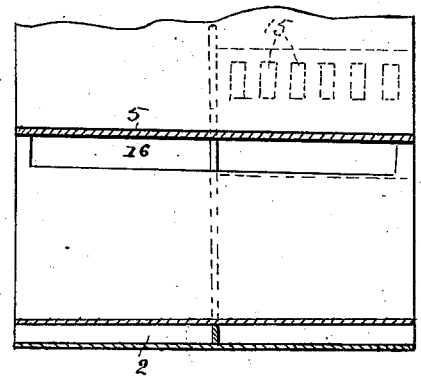

Figure 1 represents a perspective view of the stove, parts being broken away to exhibit the interior of the heating-stove proper. Fig. 2 is a similar view showing the interior of the part more especially adapted for cooking. Fig. 3 is a vertical section on line $x\ x$, Fig. 1, looking from right to left; and Fig. 4 is a transverse sectional view on line $x\ x$ indicating inclined partition and diving-flue.

The main body of the stove is preferably rectangular in cross-section, whether in a horizontal or vertical plane, and is divided by a centrally-located smoke-flue, 1, extending from top to bottom and extending entirely across the stove from side to side, except where it is divided by partitions 16 and 17 into a diving and a rising flue, as will be hereinafter described.

4 indicates a fire-chamber provided with a front door, and in some cases with a door at the side. Either door may be used singly, if desired. The fire-chamber is covered by a plate, 5, provided with covered pot-holes and a center piece, all of usual form. Said plate is the bottom of an oven or chamber, 6, provided, preferably, with doors in front and at both sides, though one or two of these may be omitted. Two or more doors enable the temperature of the oven or chamber 5 to be quickly moderated when it is desirable to introduce a hand or hands, as in stirring the contents of vessels placed in the holes in plate 5.

At 7 7 are represented two ventilating-openings. If desired, the well-known covers for cooking-vessels provided with exit-pipes can be used, and said pipes made to discharge in or through said openings. These openings are covered or uncovered at will by slides 8 8, sustained in a bent or grooved flange, 9, as indicated. Said flange can also be made to aid in supporting a removable shelf or grate, its front corners being supported upon projections from the corner standards of the framework of the stove, if such be used, or in any known manner.

10 indicates a hook for suspending a fowl or roasting piece.

Above oven 6 is another oven, 11, having doors at the side of the stove. Oven 11 is separated from the one below by a smoke-flue, which extends from side to side at the bottom, front, and top of said oven 11. The fire-chamber and each of the ovens extend from side to side. They may be lined in any approved way.

The top of the stove is covered by a plate having in it four pot-holes. Two of these may be located over the ovens, or the cooking part of the stove, and two over the heating part. This plate is also provided with a centrally-located smoke-pipe thimble, 12. It is obvious that this top plate of the stove might be made in separate parts—as, for example, the cooking and heating parts of the stove might each be covered by a separate plate and the flue 1 by another containing the thimble, the whole being arranged and joined in the usual way to entirely cover the stove.

The part of the stove indicated at 13 has at its base a fire-chamber, 14, and room above for the expansion of the products of combustion, and may, if desired, be provided with heating-drums in any known manner. A door is provided at the front, as indicated in the drawings, and one may be provided at one end of the fire-chamber, though both are not necessary.

The fire-chamber communicates through openings 15 with a diving-flue under the inclined partition 16, which, together with the vertical partition 17, directs escaping products (when the damper 3 is closed) down into a flue beneath the fire-chamber 4. The space beneath said fire-chamber is divided into two flues by a partition, 2, which does not extend entirely to the front of said space, but extends back, so as to be continuous with vertical partition 17. The products passing down the diving-flue and forward from the lower end of said flue and around partition 2 flow back to the bottom of flue 1 on the opposite side of partition 17 and rise to the top of the stove.

If damper 3 be open, the products will not take the indirect course above described, but will escape through the exit uncovered by opening said damper.

Flue 1 is provided with a damper, 18, which, when it is closed, compels products of combustion from either or both combustion-chambers 4 and 14 to pass around oven 11. When dampers 3 and 18 are both closed, as indicated in dotted lines, the products from fire-chamber 14 follow the course indicated on the drawings by arrows. This operation would throw a large amount of heat into the cooking part of the stove. Other operations of the flues and dampers are sufficiently obvious from the above description in connection with the drawings.

The inclined partition-plate 16 is placed in a position to deflect gas-currents, and also to guide a part of the soot or ashes descending in flue 1 into fire-place 4. Such matters falling in the flue 1 to the bottom thereof can be removed through the door 19. A similar door may be placed at 20. These provide for cleaning the flues under fire-box 4. A door for cleaning the flues between the ovens may be provided, as at 24.

The walls of the stove may be made with panels, or in any well-known manner and of any customary material, and provided with ornaments, ornamental work, and plating. It is preferably covered with an open-work cover, 22. This is conveniently made in two parts, each provided with a semi-cylindrical extension, 23, supported by an ornamental bracket, which extensions can be made to embrace the smoke-pipe by placing the parts of the cover together, as will be readily understood.

If the stove is located in a wall, as indicated in Fig. 3, the open-work cover can be omitted, though the wall could be provided with an arch over the stove of sufficient height to allow said cover to be used. It will be understood from the above that one part of the stove can thus be used to heat a room while the other is used for cooking in an adjoining room, the partition-wall between the rooms being adjacent to that region of the stove occupied by the flue 1.

The stove is designed to be used with a hearth similar to those used with ranges, which, together with a fender of any known form, can extend around the whole circumference of the stove; or when the stove is built into a wall two hearths and fenders may be used, as will be evident. The following dimensions, which, however, may be varied, are very suitable: height of stove proper, three feet and two or three inches; width, two feet; breadth (or depth) from front to front, two feet and three inches; width of main vertical flue, three inches; height of fire-chamber 4, eight inches; height of chamber or oven 6, seventeen inches, and of oven 11, nine inches, and width in cross-section of flues at the bottom, front, and top of oven 6, about two inches.

The stove may be fitted with grates and lining suitable for burning either wood or coal, and may be provided, particularly the heating part, with mica lights in any known manner, so as to present, when ornamented as above suggested, a very attractive appearance; but neither the particular dimensions nor the ornamentation are essential to the invention.

Heretofore a so-called "compound" stove has been constructed with a removable grated partition having on each side of it when in place a fire-chamber. These fire-chambers were thus separated by a grating, and both were arranged to discharge the products of combustion into a flue extending immediately above an open grate. Such construction I do not claim; but What I desire to claim, and secure by Letters Patent, is—

1. In a combined heating and cooking stove, the combination of the two fire-places and the central flue, 1, located between the two fire-places and communicating independently with each and extending entirely across the structure from side to side, substantially as set forth.

2. In a combined heating and cooking stove, the central flue, 1, located between two fire-places and communicating independently with each and extending from top to bottom and from side to side, in combination with a damper, 18, located in said flue 1, and with the said fire-places, substantially as set forth.

3. The combination of the fire-places 4 and 14, flue 1, communicating with both fire-places, damper 18 in flue 1, oven 11, adjacent to the upper part of flue 1, and the flue around the oven, whereby products of combustion from either fire-place, or from both, may be caused to pass around the oven, substantially as set forth.

4. In the combined heating and cooking stove, the combination of the fire-places 4 and 14, flue 1, communicating with both fire-places, the diving-flue communicating with the space under fire-place 4 and leading to the bottom of flue 1, and the damper 3, adapted to close an opening from the heating-stove into flue 1, whereby products of combustion may be directed from one fire-chamber under the other and into a common exit-flue.

5. In a combined heating and cooking stove, the combination of the fire-places 4 and 14, the diving-flue leading from fire-place 14 to the space beneath fire-place 4, the base-flues under fire-place 4, the main flue 1, adapted to receive products from both fire-places and provided with damper 18, damper 3, adapted to close the opening between the fire-place 14 and flue 1, and oven 11, having a continuous flue below, in front, and above the same, substantially as set forth.

6. The combination, in one structure, of the two fires-places, the intermediate flue, 1, therewith and provided with damper 18, ovens 6 and 11, the diving and base flues, and the damper 3, leading from fire-place 14 under fire-place 4 and into flue 1, closing the upper exit from fire-place 14 and exit 12, whereby one or both fires may be used to variously heat the ovens, as required, substantially as set forth.

7. The combination of fire-places 4 and 14, communicating with common flue 1, and said flue extending to the base of the fire-places with the inclined plate extending from the top of exit 15 to the bottom of the exit, from fire-place 4, and with the plate 17, whereby the inclined conduits from said fire-chambers are produced, substantially as set forth.

8. In an oven or cooking-chamber provided with openings leading into the smoke-flue, a flange placed below the openings, adapted to support slides for covering the openings, and to support also a shelf or grate, the projections or corner-pieces, and removable shelf or grate, all combined as specified.

In testimony whereof I affix my signature in presence of two witnesses.

JANE A. CLOTHER.

Witnesses:
H. S. COMSTOCK,
R. H. CLOTHER.